United States Patent
Laughlin

[11] Patent Number: 5,469,053
[45] Date of Patent: Nov. 21, 1995

[54] E/U CORE LINEAR VARIABLE DIFFERENTIAL TRANSFORMER FOR PRECISE DISPLACEMENT MEASUREMENT

[75] Inventor: Darren R. Laughlin, Albuquerque, N.M.

[73] Assignee: A - Tech Corporation, Albuquerque, N.M.

[21] Appl. No.: 969,882

[22] Filed: Nov. 2, 1992

[51] Int. Cl.⁶ .................... G01B 7/14; G01B 7/30; G01R 33/00
[52] U.S. Cl. .................. 324/207.18; 324/207.24; 324/207.25; 324/262; 340/870.36
[58] Field of Search .......... 324/207.15, 207.16–207.18, 324/262, 207.22–207.26, 233, 207.19; 340/870.32, 870.35, 870.36; 318/653–661

[56] References Cited

U.S. PATENT DOCUMENTS

| | | | |
|---|---|---|---|
| 2,419,979 | 5/1947 | Wilson | 324/207.18 |
| 2,912,657 | 11/1959 | Schaevitz | 73/517 A |
| 3,026,429 | 3/1962 | Karpchuk | 73/652 |
| 3,890,516 | 6/1975 | Widdowson et al. | 340/870.35 X |
| 4,051,718 | 10/1977 | Meckl et al. | 73/654 |
| 4,458,536 | 7/1984 | Ahn et al. | 73/652 |
| 5,047,719 | 9/1991 | Johnson et al. | 324/262 |

FOREIGN PATENT DOCUMENTS

| | | | |
|---|---|---|---|
| 0977578 | 7/1902 | France | 340/870.32 |
| 1047289 | 12/1958 | Germany | 324/207.18 |
| 3326477 | 1/1985 | Germany | 324/207.18 |
| 221365 | 7/1968 | Sweden | 324/207.18 |
| 0848982 | 7/1981 | U.S.S.R. | 324/207.18 |

OTHER PUBLICATIONS

Notes on LVDT, Schaevitz Engineering, Jan. 1955, p. 1.
McGraw–Hill Book Co., "Servomechanism Analysis", p. 339, 1953.

Primary Examiner—Sandra L. O'Shea
Assistant Examiner—Jay Patidar
Attorney, Agent, or Firm—Pollock, Vande Sande & Priddy

[57] ABSTRACT

The present invention relates to a displacement sensor for measuring submicroinch displacements. An LVDT is constructed from an E core having a primary winding on the center pole piece and two secondary windings about two additional pole pieces. The E core device is mounted on a stationary surface opposite a pair of U cores mounted on a translating surface. The U cores are spaced adjacent to each other, having an axis defined coincident with the axis of the E core pole piece which supports the primary winding. This position produces a null voltage from the differentially-connected secondary windings. Linear displacement between the U core and E core results in different coupling between the secondary windings and primary windings. The resulting voltage difference is a measurement of displacement $\Delta X$.

5 Claims, 4 Drawing Sheets

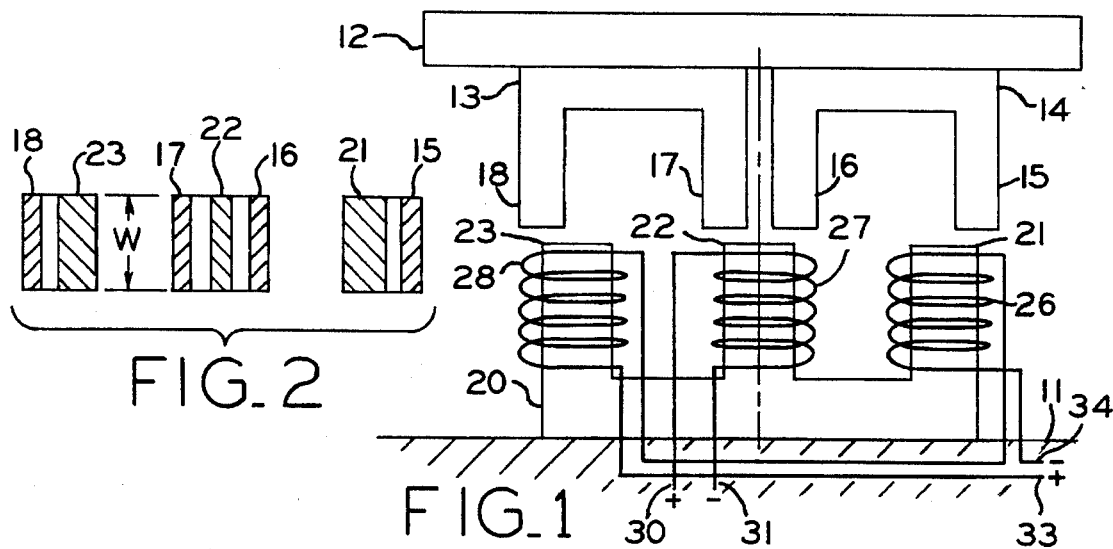
FIG. 2
FIG. 1
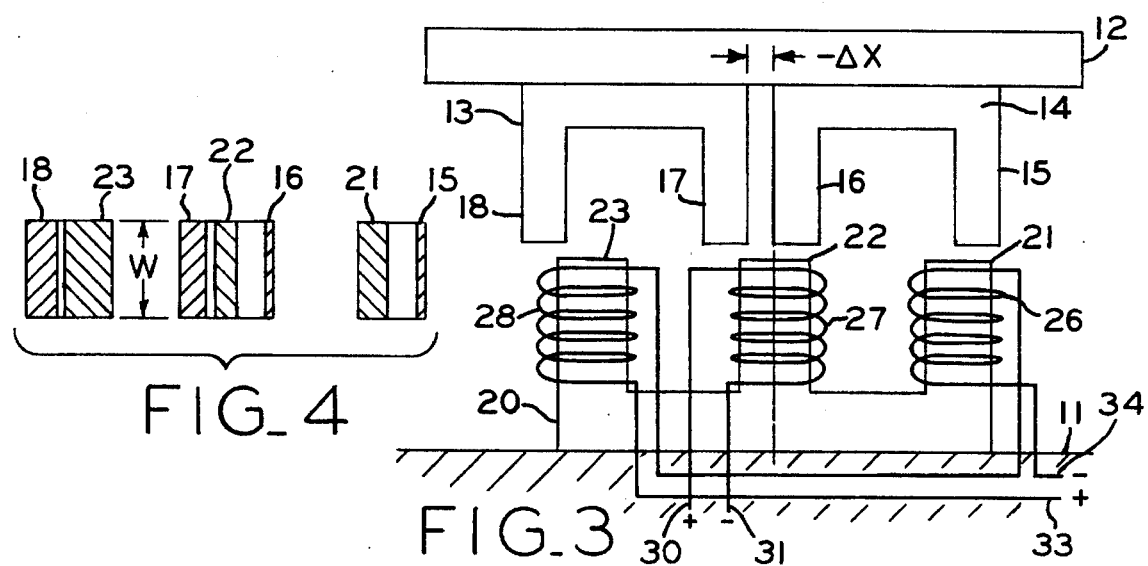
FIG. 4
FIG. 3
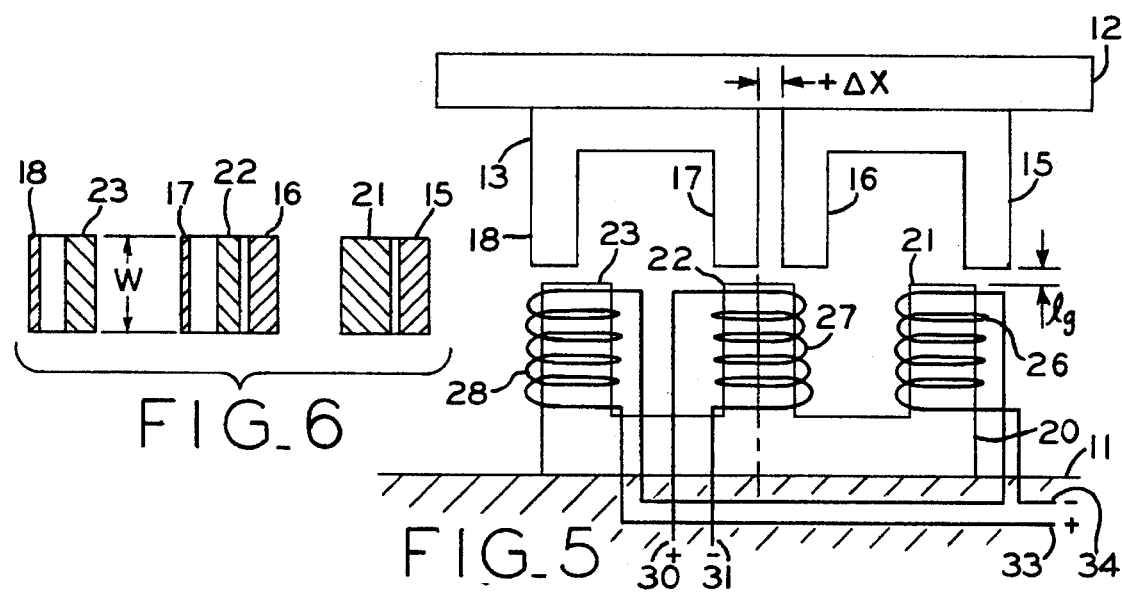
FIG. 6
FIG. 5

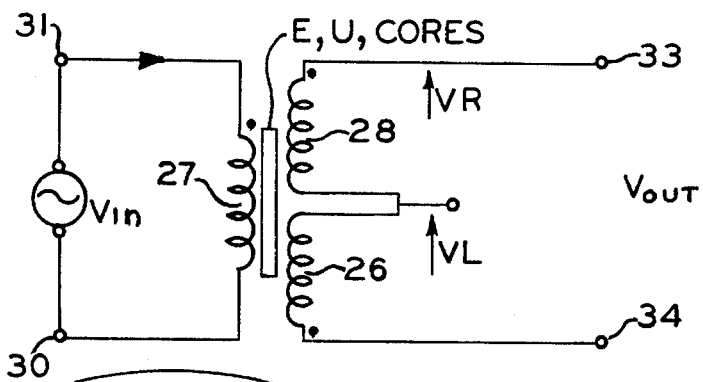
FIG_7
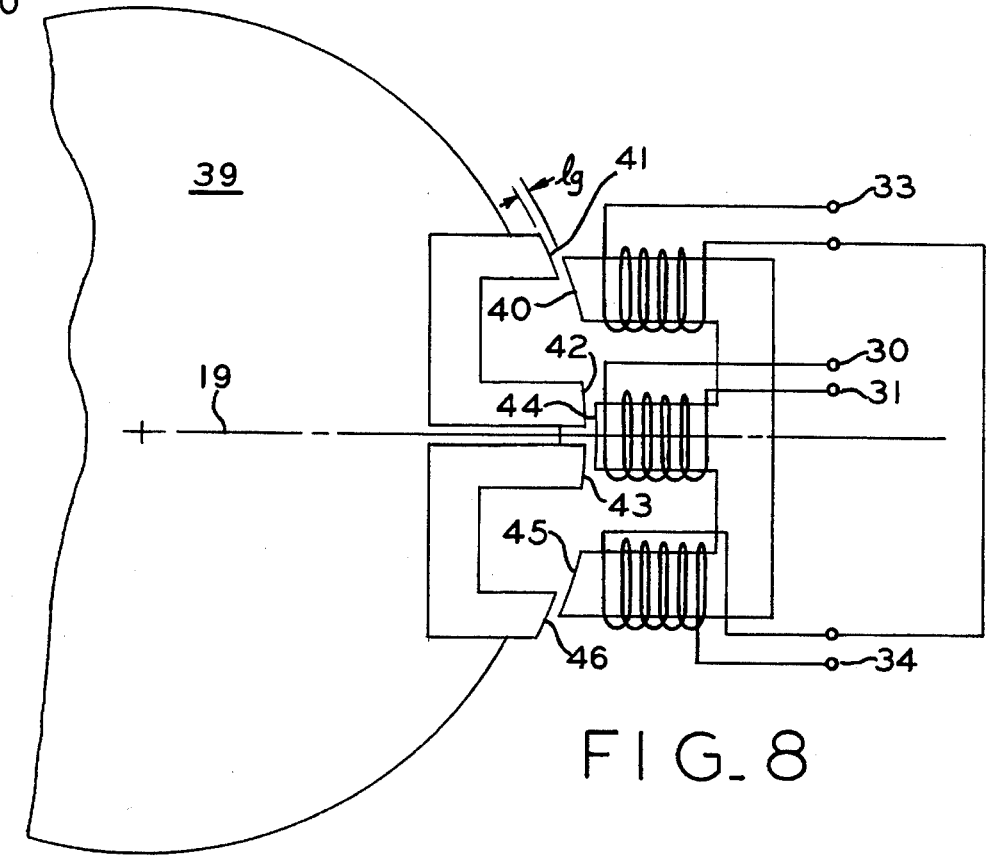
FIG_8
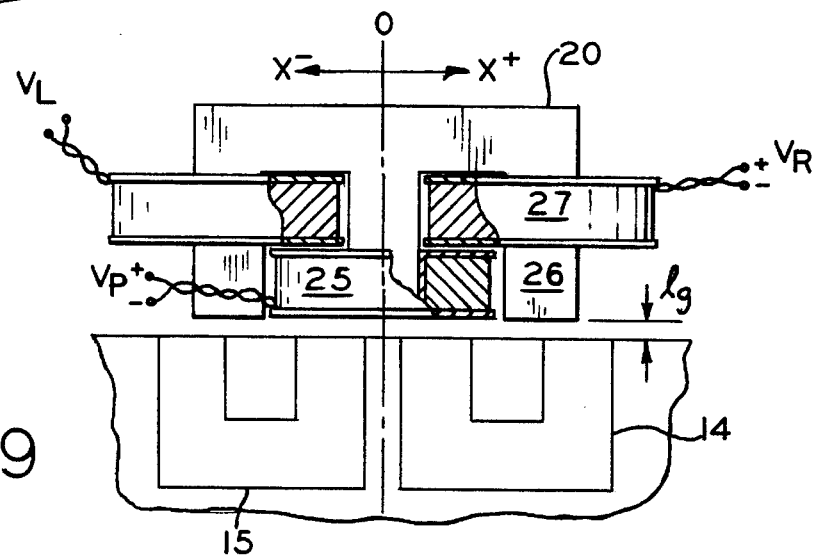
FIG_9

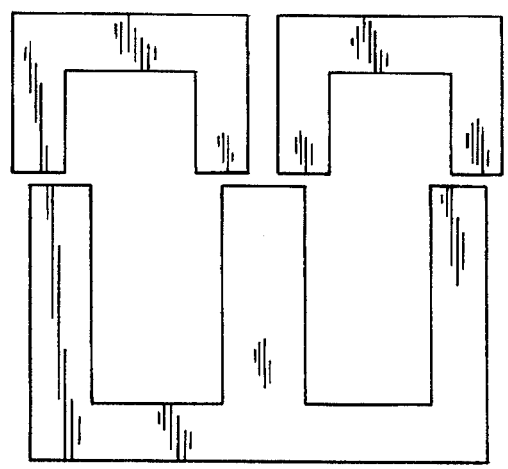
FIG_10
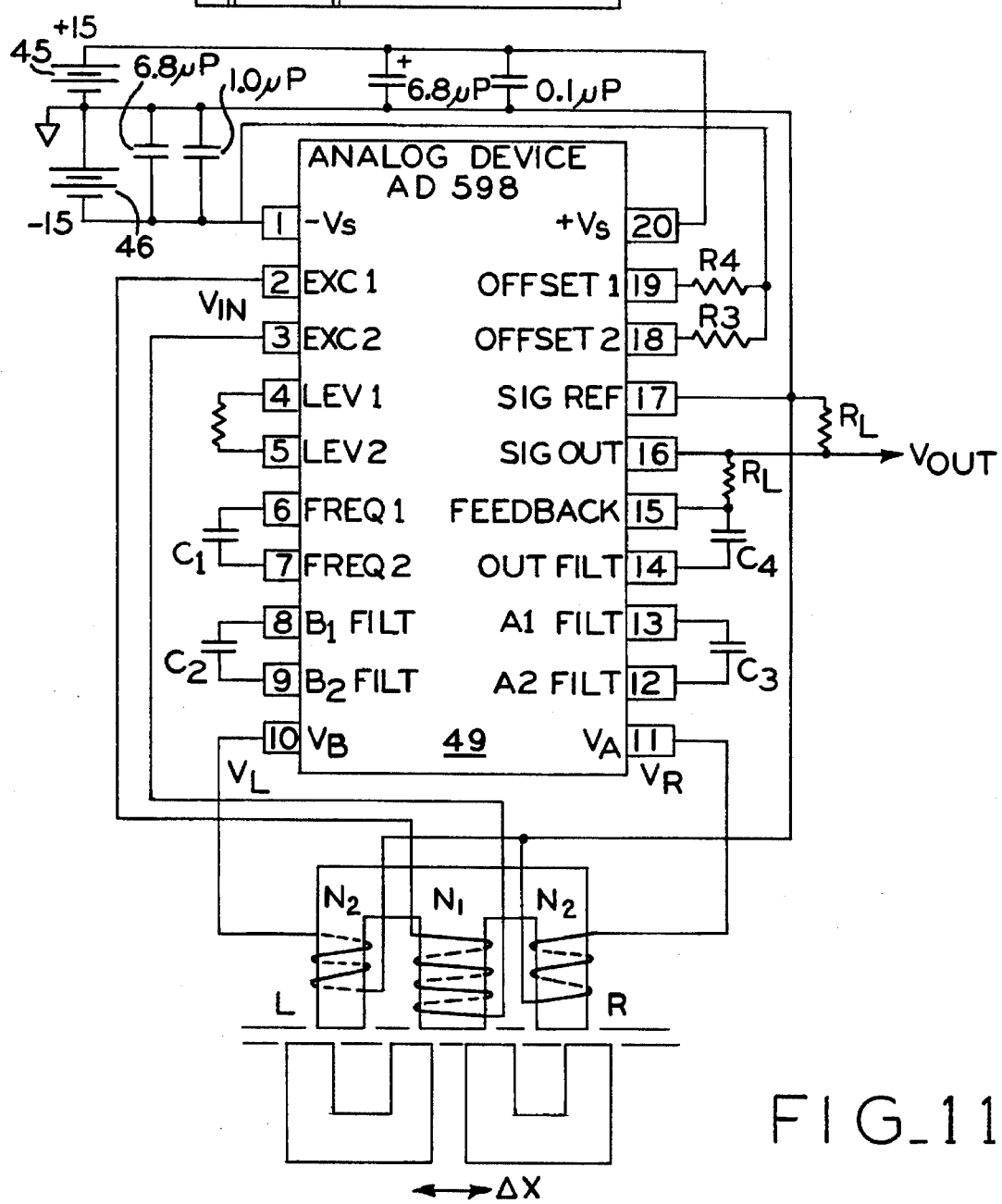
FIG_11

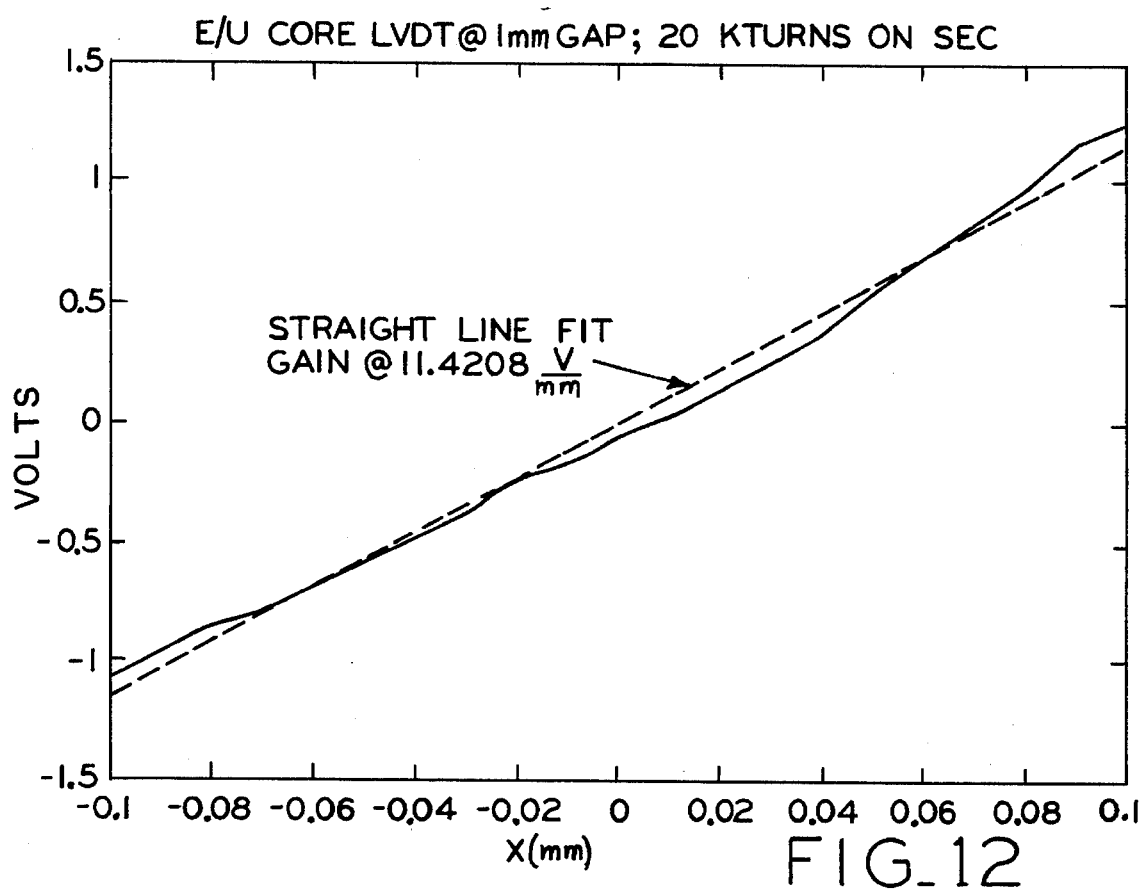
FIG_12
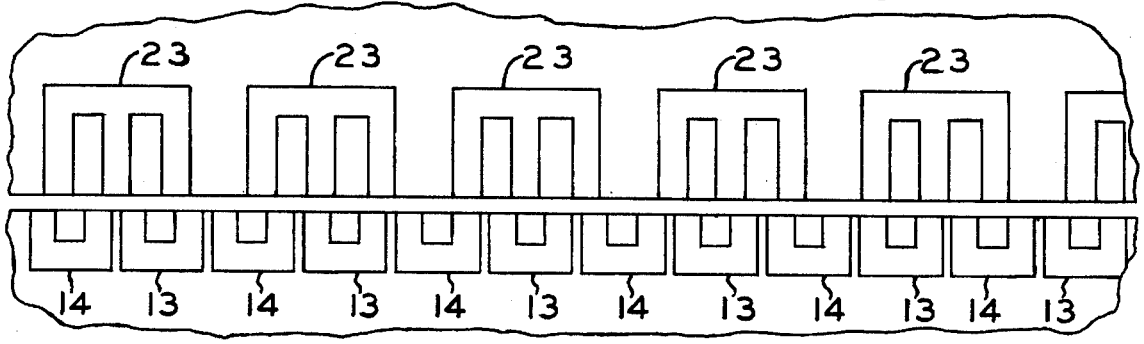
FIG_13
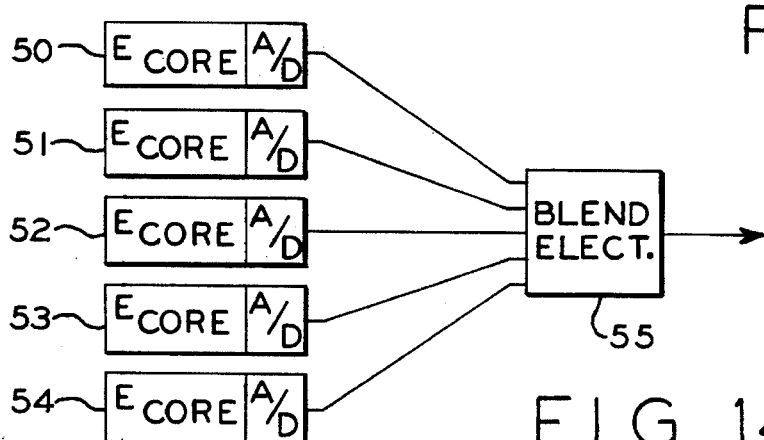
FIG_14

5,469,053

E/U CORE LINEAR VARIABLE DIFFERENTIAL TRANSFORMER FOR PRECISE DISPLACEMENT MEASUREMENT

The present invention relates to devices for measuring microinch displacements and submicroinch displacements. Specifically, a type of transducer is described for measuring the relative linear displacements between platforms.

LVDT sensors have been available for measuring linear displacements. These sensors employ a coaxial transformer having a primary winding and two secondary windings disposed in a linear coaxial relationship. The secondary windings are located on each side of the primary winding, and connected differentially. A magnetic core slides within the coaxial transformer windings and the amount of voltage induced in the respective secondary windings varies with the position of the core. When the magnetic core couples the primary winding to the right and left secondary windings such that an equal amount of voltage is induced into the secondary windings, a null position is obtained and zero voltage potential exists across the differentially-connected windings.

In operation the LVDT sensors require that the coaxial transformer be supported to a stationary surface while a plunger attached to the magnetic core is connected to a moving surface for measuring the relative displacement between the moving surface and stationary surface. The mounting of these structures can be difficult as normally it can only be mounted at the end of a moving surface which faces a stationary surface.

Additional to making measurements of linear motion, a displacement device is often needed to measure circumferential motion for rotating bodies. The linear variable differential transformers of the conventional type, having a coaxial coil and movable core member within them, are difficult to implement in this application, and other techniques, such as optical encoding, are needed to make microinch and submicroinch measurements for these applications.

SUMMARY OF THE INVENTION

It is an object of this invention to provide for a linear variable differential transformer (LVDT) which is capable of measuring linear displacements in the submicroinch range.

It is another object of this invention to provide an LVDT sensor which can measure circumferential displacements of a rotating platform.

It is yet another object of this invention to provide for an LVDT sensor which can be used to measure the relative change in sheer distance between two opposing surfaces moving with respect to each other anywhere along the surfaces.

These and other objects of the invention have been provided by an LVDT which employs an E core supporting a primary and two secondary windings. The E core includes three extending pole pieces of magnetic material, the middle pole piece supporting a primary winding and the two end pole pieces supporting first and second secondary windings, the windings being connected in a differential configuration.

The E core is supported on a platform such that the pole pieces face a surface which is moving linearly with respect to the another platform. A pair of U cores of magnetic material are supported on the second platform. In a null position, each of the U core pole pieces are equally spaced from the axis passing through the middle pole piece on the E core. In the null position, the two adjacent pole pieces of the U cores each form an air gap with the E core central pole piece having the same area. The remaining two pole pieces of the U cores form air gaps with the remaining two pole pieces of the E core of equal area.

The voltage induced in each of the secondary windings is proportional to the amount of magnetic coupling provided by each of the U cores between the primary winding and each secondary winding. Linear displacements ΔX between E core pole pieces and U core pole pieces will change the amount of coupling, thus changing the voltage output from the null position to a voltage representing the magnitude of the displacement ΔX.

The E/U core LVDT is capable of being utilized any place where there is relative sheer motion between two surfaces.

DESCRIPTION OF THE FIGURES

FIG. 1 is a schematic illustration of an LVDT sensor in accordance with a preferred embodiment for measuring displacements between a moving platform and a stationary platform.

FIG. 2 illustrates the overlap between pole pieces of the respective U and E cores of the LVDT sensor of FIG. 1.

FIG. 3 illustrates the motion of the U cores with respect to the E core when measuring a negative displacement ΔX.

FIG. 4 demonstrates the change in overlap between the U core pole pieces and E core pole pieces of FIG. 3, resulting in a voltage imbalance in the differentially-connected secondary windings.

FIG. 5 illustrates the LVDT sensor of FIG. 1 when measuring a positive displacement ΔX.

FIG. 6 illustrates the overlap between the U core arms and E core arms in measuring a positive displacement ΔX.

FIG. 7 is an equivalent circuit for the sensor of FIGS. 1–6.

FIG. 8 illustrates the use of the E core sensor for measuring circumferential displacement of a rotating body.

FIG. 9 is an illustration of a specific embodiment whose performance is represented in FIG. 11.

FIG. 10 shows the mechanical dimensions for the E core and U core used in the sensor of FIG. 9.

FIG. 11 shows the electronics connected to the sensor of FIG. 9 for exciting the primary winding and measuring the output voltage.

FIG. 12 illustrates the output voltage of the device of FIG. 11 with respect to displacement ΔX.

FIG. 13 illustrates an array of E/U core sensors for measuring a measurement stroke in excess of the capability of a single transducer.

FIG. 14 illustrates electronics for blending the output signals of each E/U core sensor of FIG. 13.

DESCRIPTION OF THE PREFERRED EMBODIMENT

Referring now to FIG. 1, there is shown the general arrangement of an LVDT sensor in accordance with the preferred embodiment of the invention. Linear displacement in the submicroinch range is measured between the moving platform 12 and stationary platform 11. A pair of U cores 13 and 14 are supported on the moving platform 12, having pole pieces which extend toward the pole pieces of an E core 20 supported by the stationary platform 11, and form a magnetic air gap therewith.

The pair of U core magnetic elements 13 and 14 are positioned so that pole pieces 16 and 17 are adjacent to each other. The axis defined by the spacing between pole pieces 16 and 17 is coincident with the axis of pole piece 22 of the E core 20, constituting a null position for the sensor.

The remaining pole pieces 15 and 18 of the U cores 13 and 14 are spaced from the remaining pole pieces 21 and 23 of the E core.

The E core pole piece 22 supports a primary winding 27 of a transformer having two secondary windings 26 and 28, wound on the pole pieces 21 and 23. The primary winding is connected to a source of alternating voltage through terminals 30, 31 and generates magnetic flux which is coupled via the pole piece 22, air gap LG, and each of the U cores 13 and 14 to the secondary windings 26 and 28.

In the null position, the coupling between each of the secondary windings 26 and 28 is equal. Since each of the secondary windings 26 and 28 are connected to each other differentially, a zero or null voltage is obtained in the position shown in FIG. 1.

FIG. 2 demonstrates that for each of the opposing pole pieces, pole pieces 18 and 23 form an air gap of approximately the same surface area as an air gap formed between pole pieces 15 and 21. Pole pieces 16 and 17 each form an air gap having substantially the same surface area with respect to pole piece 22. As the air gap surface areas are equal, equal flux and therefore equal voltage is induced into each of the secondary windings 26 and 28.

The operation of the device of FIG. 1 with respect to a negative displacement, i.e., the moving platform 12 moving left with respect to the stationary platform is illustrated in FIG. 3. The corresponding section view FIG. 4 illustrates that more coupling occurs between the pole pieces 15 and 21 than between the pole pieces 18 and 23, due to a larger air gap surface area between 15 and 21 and 16 in 22. A potential difference and output voltage is generated between terminals 33 and 34 when an alternating voltage is applied to the primary winding 27 input terminals 30 and 31.

FIG. 5 illustrates the condition wherein the moving platform 12 moves to the right with respect to the stationary platform 11. The corresponding section view of FIG. 6 illustrates more coupling takes place between the primary winding 27 and the secondary winding 28, as opposed to the coupling between the primary winding 27 and secondary winding 26. This is represented by the air gap between pole pieces 18 and 23 and 17 and 22, leaving a larger surface area than that between pole pieces 16 and 22 and 15 and 21. Therefore, the positive displacement $\Delta X$ will produce an opposite potential between terminals 33 and 34.

An equivalent circuit for the LVDT sensor of FIG. 1 is shown in FIG. 7. FIG. 7 illustrates that terminals 30 and 31 are connected to a source of alternating voltage VIN. The primary winding 27 is wound in a sense with respect to secondary windings 28 and 26 to induce a potential having the polarity shown by the dots at one end of each winding. One end of each of the secondary windings 26 and 28 is connected together to form a common terminal. The differential voltage is obtained across the series combination of secondary winding 26 and 28, which terminates in terminals 34 and 33. Movement of the pair of U cores with respect to the E core produces the differential voltage.

In the preferred embodiment, it is assumed that it is more convenient to mount the pair of adjacent U cores 13 and 14 on the moving platform. This would eliminate any drag or unforeseen measurement disturbances which result from leads leaving the moving platform connected to a stationary measurement device. It is clear that the pair of U cores and E cores can be interchanged for those applications where it might be more advantageous to make measurements from the moving platform instead of the stationary platform.

FIG. 8 illustrates yet another embodiment of the invention which will provide for a measurement of the circumferential displacement of a rotating body 39. The rotating body 39 includes a pair of U cores having pole faces 41, 42, 43 and 46 opposite pole faces 40, 44 and 45 of an E core. These pole faces are curved to have a radius such that passage of the pole faces with respect to each other will maintain a common air gap distance LG. These circumferential distance measurements will permit the calculation, along with a suitable time base, of the rotation speed of rotary surface 39.

The foregoing structure of the E/U core LVDT sensor was tested in accordance with the embodiment of FIG. 9. FIG. 9 illustrates a construction using an E core which is obtained from Siemens as an N41 material. A primary winding 27 was formed of 1100 turns of #38 AWG magnet wire. Secondary windings 26 and 28 were formed of 20,000 turns of #50 AWG wire. The dimensions of the E and U cores are given in FIG. 10. The E core had a width for each pole piece of 7.5 mm. and the U core had a width of 6.7 mm. In the null position, an overlap of 2.5 mm was obtained between the E core pole piece 22 and the U core pole pieces 16 and 17.

The circuit shown for exciting the winding 27 and measuring the differential voltage from secondary windings 26 and 28 is shown more particularly in FIG. 11. The integrated circuit is an Analog Device, AD598 LVDT signal conditioner integrated circuit 49, connected to a ±15 volt power supply 45 and 46. Various components are shown, including capacitors and resistors which may be selected from the data sheet distributed by Analog Devices for this integrated circuit.

The integrated circuit provides a filter having a 100 Hz. bandwidth but which, as can be appreciated by those skilled in the art, could be extended to operate over a 1 kHz bandwidth if needed. The device provides for a voltage versus displacement function shown in FIG. 12. Displacements of hundredths of a millimeter were made from a sensor which had a gain of 11.4208 volts per millimeter.

The sensor in accordance with FIG. 9, can be described as having an output voltage $\Delta V_{out}$ as follows:

$$V_{out} = \frac{4 W N_2 \Delta X V_{in}}{N_1} \left[ \frac{1}{A_{OL}^R + A_{OL}^L} \right]$$

$N_1$ and $N_2$ represent the respective turns of each of the primary and secondary windings, $\Delta X$ the displacement, $V_{in}$ the voltage applied to the primary winding, and W represents the width of the pole piece, as shown in FIGS. 2, 4, 6.

The second factor in the equation represents a combination of the areas of the pole pieces forming the air gaps. $A_{OL}^R$ represents the air gap area subtended by the right-most U core, with respect to pole pieces of the E core and $A^{OL \ L}$ represents the area subtended by the left-most U core with respect to the E core air gap. This function can also be represented as $$V_{out} = V_R - V_L = \frac{\mu_0 N_1 N_2 I_1 W \Delta X}{LG}$$

In this equation, ± represents the time deivative of the current in the primary winding, $V_R$ is the right-most secondary winding voltage and $V_L$ is the left-most secondary winding voltage. $\mu_o$ is the magnetic permeability of air.

As the sensitivity factor for the device, the equation can be derived from the foregoing as follows:

$$(V_R - V_L)/V_{in} \Delta X = \frac{4WN_2}{N_1 A_t} \quad ; A_t = A_{OL}^R + A_{OL}^L$$

$A_t$ is the total E/U core overlap area. This equation is true when the E/U LVDT is operated well above $f_o$, where $$f_o = \frac{R_1}{2\pi L_1}$$

where $R_1$ is the primary winding resistance and L is the inductance of the primary winding.

The sensor in accordance with FIGS. 9 and 10 would provide for displacement measurements of ±2 mm.

In order to increase the stroke length for the measurement sensors, an array of such sensors may be configured on the platforms on which relative displacement is to be measured. Referring now to FIG. 13, there is shown an array of five E cores 23 positioned on one platform with equal numbers of pairs of U cores 13, 14 on the facing platform. Each of the U cores 13, 14 is positioned with respect to an opposing E core 23, such that at any given time, one of the sensors represented by a single E core 23 and a pair of U cores 13, 14 is providing an output signal within its linear range of ±2 mm. The output from each of the E core devices 23 is summed in a blending circuit.

FIG. 14 demonstrates how each of the differentially-connected secondaries of the array of FIG. 13 are connected to a plurality of LVDT processing integrated circuits (AD 598) 50 through 54. The LVDT processing integrated circuits (AD 598) are in turn connected to a blending circuit 55.

The blending circuit 55 will determine which of the sensors is operating within its linear range. It will provide an output signal identifying the sensor which is operating in its range, as well as the value of displacement being measured by the sensor.

Using the information identifying the sensor and displacement measured by the sensor, it is possible to determine the overall displacement between the platforms.

Thus, there has been described with respect to several embodiments a new type of LVDT sensor for measuring submicroinches of displacement. Those skilled in the art will recognize yet other embodiments defined more particularly by the claims which follow.

What is claimed is:

1. A linear variable differential transformer for measuring linear displacement comprising:

a first and second spaced apart magnetic U core pieces, each having a pair of pole pieces;

an E core made of magnetic material having first, second and third pole pieces, facing said first and second magnetic U core pole pieces and forming an air gap therewith;

a first transformer winding supported by said second pole piece of said E core adapted to be connected to a source of alternating voltage;

second and third transformer windings supported by said first and third pole pieces of said E core, said second and third windings differentially-connected together to provide an output voltage proportional to the minute linear displacement between said U cores and said E core.

2. The linear variable transformer of claim 1 wherein said first winding comprises $N_1$ turns of an insulated conductor, and each of said second and third windings comprise $N_2$ turns of an insulated conductor, and the voltage produced by said differentially-connected second and third windings $V_{out}$ proportional to $$\frac{W\mu_0 N_1 N_2 \dot{I}_1}{LG} \Delta X$$

wherein W is a common overlap width of said U core and E core pole pieces, $\mu_0$ is the magnetic permeability of air, LG is the air gap between said U core pole pieces and said E core pole pieces, $\dot{I}_1$ is the time derivative of the current through said first winding and $\Delta X$ is the linear displacement between said E core and said pair of U cores.

3. A linear variable differential transformer for measuring circumferential displacement of a rotating object comprising:

a pair of U core magnetic elements, each having a pair of arms, said pair of U core magnetic elements being spaced symmetrically about an axis extending along a radius of said rotating object;

an E core having first, second and third pole pieces, said second pole piece having an axis coincident with said radius, said second pole piece having a primary winding adapted to receive a current for generating a magnetic field, said first and third pole pieces having windings which are differentially-connected together, producing a voltage proportional to the minute displacement between said E core axis and said pair of U core axes, one of said E core and said pair of U cores being connected to rotate with said object, while the other of said E core and said pair of U cores are stationary.

4. The linear variable differential transformer of claim 3 wherein said E core pole pieces and U core pole pieces have facing surfaces which are formed along a common radius to have a complementary curvature so that an air gap of a constant thickness is formed between said E core and U core pole pieces.

5. An array of LVDT sensors measuring displacements between surfaces comprising:

a plurality of E cores supported on the base of one of said surfaces, said E cores being evenly spaced in a linear array, said E cores having first, second and third pole pieces facing another of said surfaces, said first and third pole pieces each supporting a secondary winding, said secondary windings of an E core being differentially connected together, said second pole piece supporting a primary winding connected to a source of alternating current;

a plurality of pairs of U cores, supported on said another surface, each U core having a pair of pole pieces facing said E core pole pieces, forming an air gap therewith, said pairs of U cores being spaced so that at least one pair of U cores is positioned under one of said E cores as said surfaces are linearly displaced with respect to each other; and, circuit means connected to each of the differentially connected secondary windings, said circuit means blending signals received from each of the E cores, and providing an output signal representing one of said E cores which is providing a voltage proportional to the minute displacement of one pair of U cores.

* * * * *